United States Patent
Putz

(10) Patent No.: US 11,643,139 B2
(45) Date of Patent: May 9, 2023

(54) METHOD FOR STEERING A VEHICLE

(71) Applicant: SYN TRAC GmbH, Bad Goisern (AT)

(72) Inventor: Stefan Putz, Bad Goisern (AT)

(73) Assignee: SYN TRAC GMBH, Bad Goisern (AT)

(*) Notice: Subject to any disclaimer, the term of this patent is extended or adjusted under 35 U.S.C. 154(b) by 448 days.

(21) Appl. No.: 16/870,624

(22) Filed: May 8, 2020

(65) Prior Publication Data
US 2020/0269915 A1    Aug. 27, 2020

Related U.S. Application Data

(63) Continuation of application No. PCT/EP2018/080823, filed on Nov. 9, 2018.

(30) Foreign Application Priority Data

Nov. 10, 2017 (DE) .................... 10 2017 126 481.7

(51) Int. Cl.
| | |
|---|---|
| *B62D 13/00* | (2006.01) |
| *B62D 7/15* | (2006.01) |
| *B62D 6/00* | (2006.01) |
| *B62D 7/14* | (2006.01) |
| *B62D 15/02* | (2006.01) |

(52) U.S. Cl.
CPC ........... *B62D 7/1509* (2013.01); *B62D 6/002* (2013.01); *B62D 7/144* (2013.01); *B62D 13/005* (2013.01); *B62D 15/024* (2013.01)

(58) Field of Classification Search
CPC ........ B62D 7/04; B62D 15/024; B62D 7/026; B62D 6/002; B62D 13/005; B62D 13/00; B62D 7/1509; B62D 7/144
See application file for complete search history.

(56) References Cited

U.S. PATENT DOCUMENTS

| | | | |
|---|---|---|---|
| 5,329,451 A | 7/1994 | Notsu | |
| 6,929,086 B1 | 8/2005 | Husain et al. | |
| 9,751,558 B2 * | 9/2017 | Lavoie | B62D 1/04 |
| 9,783,227 B2 * | 10/2017 | Shimizu | B62D 5/04 |
| 9,802,644 B2 * | 10/2017 | Nakamura | B62D 6/00 |

(Continued)

FOREIGN PATENT DOCUMENTS

| | | |
|---|---|---|
| CN | 104773202 A | 7/2015 |
| DE | 19 76 458 U | 1/1968 |

(Continued)

OTHER PUBLICATIONS

Wang et al., Driver-vehicle closed-loop simulation of differential drive assist steering control system for motorized-wheel electric vehicle, 2009, IEEE, p. (Year: 2009).*

(Continued)

*Primary Examiner* — McDieunel Marc
(74) *Attorney, Agent, or Firm* — Stephen J. Kenny; Vincenzo DiMonaco; Foley Hoag LLP

(57) ABSTRACT

A corresponding vehicle includes two steerable axles VA1 and HA1 each with an angle sensor, wherein a rear axle HA1 in an all-wheel mode is synchronously steered with the front axle VA1 in the opposite direction, this being designated as a 4×4 steering system. The vehicle further includes a control device for setting the steering angle of the axles based on the data provided by angle sensors.

3 Claims, 4 Drawing Sheets

(56) References Cited

U.S. PATENT DOCUMENTS

| | | | |
|---|---|---|---|
| 9,827,982 B2 * | 11/2017 | Owen | B60W 30/18145 |
| 9,902,423 B2 * | 2/2018 | Herman | B62D 5/008 |
| 10,518,831 B2 * | 12/2019 | Wright | B60L 50/60 |
| 10,661,827 B2 * | 5/2020 | Redeker | B62D 7/148 |
| 2006/0261214 A1 | 11/2006 | Wallner et al. | |
| 2009/0032273 A1 | 2/2009 | Hahn | |
| 2014/0145498 A1 * | 5/2014 | Yamakado | B60W 10/08 303/3 |
| 2016/0046287 A1 * | 2/2016 | Owen | B60W 10/04 701/43 |
| 2022/0135125 A1 * | 5/2022 | Wang | B60D 1/62 701/41 |

FOREIGN PATENT DOCUMENTS

| | | |
|---|---|---|
| DE | 691 05 460 T2 | 5/1995 |
| DE | 10 2005 007 725 A1 | 9/2005 |
| DE | 10 2005 023 286 A1 | 12/2006 |
| DE | 10 2007 036 429 A1 | 2/2009 |
| DE | 10 2009 017 831 A1 | 10/2010 |
| WO | WO-2013/119109 A1 | 8/2013 |
| WO | WO-2015/060752 A1 | 4/2015 |

OTHER PUBLICATIONS

Achyuthan et al., Modelling of asteer-by-wiresystem with force feedback and active steering, 2017, IEEE, p. (Year: 2017).*

Wang et al., Modeling and simulation studies on differential drive assisted steering for EV with four-wheel-independent-drive, 2008, IEEE, p. (Year: 2008).*

Zhao et al., Development of a Four Wheel Independent Drive and Four Wheel Independent Steer Electric Vehicle, 2015, IEEE, p. (Year: 2015).*

Tang et al., Differential drive steering research on multi-axle in-wheel motor driving vehicle, 2014, IEEE, p. (Year: 2014).*

Zhang et al., A Novel Steering System for a Space-Saving 4WS4WD Electric Vehicle: Design, Modeling, and Road Tests, 2017, IEEE, p. (Year: 2017).*

Jagirdar et al., Steering strategy for a multi-axle wheeled vehicle, 2017, IEEE, p. 164-171 (Year: 2017).*

Wu et al., Speed following control for differential steering of 4WID electric vehicle, 2014, IEEE, p. 3054-3059 (Year: 2014).*

International Search Report and Written Opinion for Application No. PCT/EP2018/080823 dated Feb. 22, 2019.

Search Report for DE Priority Application 102017126481.7 dated Dec. 10, 2018.

* cited by examiner

METHOD FOR STEERING A VEHICLE

CROSS-REFERENCE TO RELATED APPLICATIONS

This application is a Continuation of and claims the benefit of priority under 35 USC 120 to PCT/EP2018/080823 filed Nov. 9, 2018, which claims priority to DE 10 2017 126 481.7 filed Nov. 10, 2017, the entire contents of each are hereby incorporated by reference.

The present disclosure relates to a method for steering a vehicle. Steering is defined as a mechanism for influencing the travel direction of vehicles of any kind. There are various kinds of steering with reference to vehicles. Two-wheel steering is the commonest form of steering in most road vehicles, in which both wheels of the same axle are steered. Front-axle steering is the usual steering system in most motor vehicles. Rear-wheel steering is often used in special vehicles such as forklift trucks or combine harvesters, because other components make front installation impossible.

Steering on two front axles positioned close behind one another is called double front-wheel steering. This steering system is used to avoid understeering on loose or slippery terrain, and is used for special vehicles. Another reason for installation is to avoid heavy wear on the tyres caused by the typical "grinding" of double axles during cornering (Ackermann's Law). This kind of steering is often linked to all-wheel drive. It is for example found in 3-axle semitrailer tractors, 4-axle construction site trucks and heavy duty trucks.

Front-wheel steering in 3-axle vehicles comprises the steerable front axle and two closely spaced rear axles (double axle). During cornering the rear axles cannot travel on a circular path with the front axle, but move at an angle to their own direction of movement. They grind on the road and force understeering behavior on the vehicle. This kind of steering is normally used in vehicles with large payloads, goods vehicles and their trailers.

In an all-wheel steering system all the wheels of a vehicle can be steered. This gives a smaller turning radius and has a further advantage in the case of all-wheel drive: the drive can be effected in the direction steered. All-wheel steering is used in agricultural vehicles or in heavy duty transporters, among others. A distinction is made between the following kinds of all-wheel steering:

- Proportional steering, in which the rear wheels are steered in a specific ratio to the front wheels, for example the front wheel is moved through 2°, the rear wheel correspondingly through 0.4°.
- Synchronous steering, in which the front and rear wheels are turned equally, resulting in the rear wheels following precisely in the track of the front wheels.
- Deceleration steering, in which the rear wheels are only turned at a specific angle of the front wheels.
- Crab steering is a steering system used mainly in agriculture. Here the front wheels and the rear wheels are turned in the same direction. This results in an offset front and rear axle when travelling in a straight line. The soil is thereby protected.
- Front-wheel/rear-wheel steering is built into 3-axle commercial vehicles with a double rear axle. In this one of the two rear axles steers in addition to the front axle. If the first rear axle is the steering axle, this steers in the same direction as the front axle. The second rear axle, on the other hand, would steer in the opposite direction to the front axle. This means that the vehicle is more maneuverable and easier to handle, as grinding of the rear axles is avoided. Application mainly in heavy duty trucks, which often have to be moved on restricted terrain (e.g. refuse collection vehicles).

SUMMARY OF THE DISCLOSED SUBJECT MATTER

The object of the present disclosure is to provide a method for steering a vehicle, in particular a multifunctional towing and implement-carrying vehicle, if necessary with add-on implements or trailers, which allows the easier and safer operation and steering of a vehicle.

The present disclosure relates to a method for steering a vehicle. A corresponding vehicle includes at least two steerable axles VA1 and HA1 each with an angle sensor, wherein a rear axle HA1 in an all-wheel steering mode is synchronously steered with the front axle VA1 in the opposite direction, this being designated as a 4×4 steering system. The vehicle further includes a control device for setting the steering angle of the axles based on the data provided by angle sensors.

A second steerable rear axle HA2 of an add-on implement may also be provided and be non-destructively detachable connectable to the vehicle (steering method for a 6×6 vehicle with two rear axles), wherein the second steerable rear axle HA2 of the add-on implement has an angle sensor. In particular it is envisaged that when the second rear axle is coupled, the first front axle VA1 and the rear axle HA2 positioned in the direction of travel are synchronously steered in the all-wheel steering mode, wherein a steering angle of the first rear axle HA1 is automatically adjusted in accordance with the steering position of VA1 and HA2, this being designated as a 6×6 steering system with two rear axles.

According to the disclosure it can be envisaged that when coupling the second rear axle HA2 the 4×4 steering system automatically becomes a 6×6 steering system, so that both rear axles HA1 and HA2 automatically convert to the synchronization mode of the 6×6 steering system, and/or that when the second rear axle HA2 is uncoupled the 6×6 steering system automatically becomes a 4×4 steering system, so that the remaining rear axle HA1 on the vehicle automatically converts to the synchronization mode of the 4×4 steering system described above. For this purpose the appropriate sensors are provided to supply the control device with data as to whether a second rear axle is coupled or uncoupled.

Furthermore, a second steerable front axle VA2 of another add-on implement may be provided and be non-destructively detachable connectable to the latter (method of steering for an 8×8 vehicle with two rear and two front axles), wherein the second steerable rear axle HA2 of the add-on implement has an angle sensor, and wherein, when the second rear axle HA2 and the second front axle VA2 are coupled, the second front axle VA2 and the two rear axles HA1 and HA2 track the first front axle VA1, this being designated as an 8×8 steering system with two front and two rear axles.

Here according to the disclosure it can be envisaged that when the second front axle VA2 is coupled the 6×6 steering system automatically becomes an 8×8 steering system, so that there is automatic conversion to the synchronization mode of the 8×8 steering system, and/or that when the second front axle VA2 is coupled an 8×8 steering system automatically becomes a 6×6 steering system, so that there is automatic conversion to the synchronization mode of the 6×6 steering system described. The requisite data as to whether a vehicle is coupled or uncoupled are detected by the control device by means of appropriate sensors and made available to the control device via data links. On the basis of data the control device can identify the 4×4 mode or the 6×6 mode or the 8×8 mode and automatically convert to the synchronization mode of the 4×4 or the 6×6 or the 8×8 steering system.

A two-axle trailer with two axles AA1 and AA2, which are also of steerable design and have an angle sensor, may be coupled to the 4×4 vehicle or to the 6×6 vehicle with two rear axles or to the 8×8 vehicle with two rear axles and two front axles, wherein in the coupling device is integrated a further angle sensor or an angle sensor device designed to provide control signals for controlling the rear axle.

Here it can be envisaged according to the disclosure that the angle sensor in the trailer coupling instead of the angle sensor in the front axle VA1 is selected to control the axles of the trailer, so that parity with the first front axle VA1 of the vehicle and of the steerable trailer axle(s) AA1 and AA2 is automatically established, so that the trailer is automatically synchronously steered with the front axle VA1.

Furthermore, according to the disclosure a method for steering a 6×6 vehicle with two rear axles and a two-axle trailer may be envisaged, the method of steering here being effected in accordance with the principle described by reference to the 4×4 steering system. Furthermore, according to the disclosure provision may also be made for a vehicle with eight steerable axles, which accordingly pulls a two-axle trailer with two steerable axles AA1, AA2. The aforementioned steering logics and methods for steering can be analogously transferred to this.

The present disclosure will now be explained in more detail with the aid of the figures.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Figure 1:
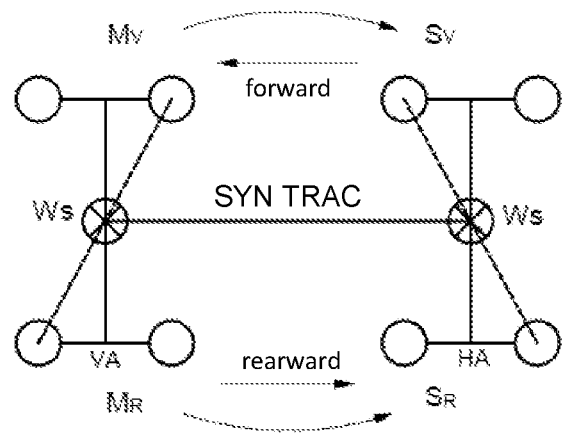
FIG. 1: a schematic representation of a known 4×4 steering logic.

A steering logic according to the disclosure is described by way of example below, using several exemplary embodiments which differentiate the following various steering operations. These are front axle steering, all-wheel steering, crab steering, synchronous steering, and more generally a steering operation for steering the axles. Definitions of these different steering operations are mentioned in the descriptive introduction, to which reference is hereby made in full. The steering logic according to the disclosure will first be explained on the basis of a vehicle with or without all-wheel drive with two steerable axles (FIG. 1).

The vehicle may, furthermore, be equipped with all-wheel drive and/or with rear-wheel drive. This is therefore a 4×4 steering system. As explained above, both axles, i.e. both a front axle and a rear axle, are provided with an angle sensor. In one direction of travel a front axle in the context of the present disclosure is designated as the master, this being connected directly with the steering wheel or corresponding steering equipment in the driver's cab.

In an all-wheel steering mode the rear axle is synchronously steered with the front axle in the opposite direction. In this way it is possible to obtain an extremely small turning circle compared with a vehicle in which only the front axle can be steered. This kind of steering method is already known from prior art. Such operation is particularly advantageous in snow clearing work, as the rear wheels follow exactly in the track of the front wheels and thus do not drive on a snow clearance cone but in an already pre-pressed channel.

Figure 2:
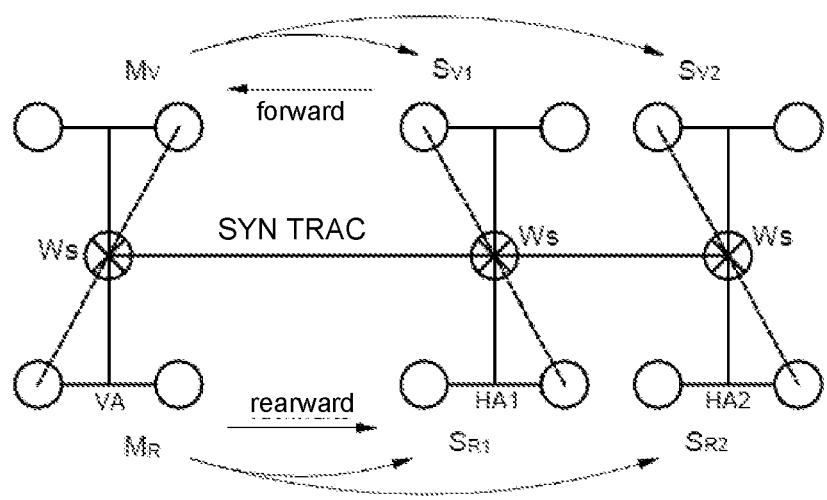
FIG. 2: a schematic representation of a 6×6 steering logic with two rear axles.
Figure 3:
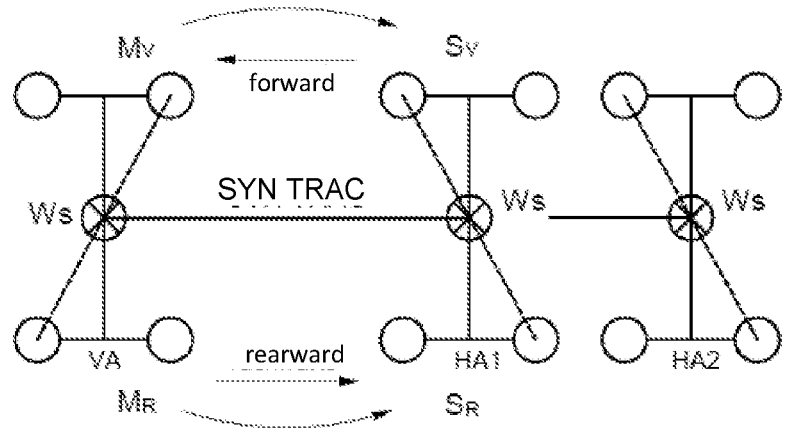
FIG. 3: a schematic representation of another 6×6 steering logic with two rear axles.

The vehicle according to the disclosure may also have a steerable front axle as well as two steerable rear axles. In the context of the present disclosure this is designated as a method for steering a 6×6 vehicle with two rear axles (FIGS. 2 and 3). Provision is thus made for a second steerable rear axle HA2 of an add-on implement non-destructively detachable connectable to the vehicle (method of steering for a 6×6 vehicle with two rear axles), wherein the second steerable rear axle HA2 of the add-on implement has an angle sensor. In particular it is envisaged that when the second rear axle is coupled, the first front axle VA1 and the rear axle HA2 positioned in the direction of travel are synchronously steered in the all-wheel steering mode, wherein a steering angle of the first rear axle HA1 is automatically adjusted in accordance with the steering position of VA1 and HA2, this being designated as a 6×6 steering system with two rear axles.

In accordance with the disclosure it is envisaged that when coupling the second rear axle HA2 the 4×4 steering system automatically becomes a 6×6 steering system, so that both the rear axles HA1 and HA2 automatically convert to the synchronization mode of the 6×6 steering system, and/or when uncoupling the second rear axle HA2 the 6×6 steering system automatically becomes a 4×4 steering system, so that the remaining rear axle HA1 on the vehicle automatically converts to the synchronization mode of the 4×4 steering system explained above. For this purpose the appropriate sensors are provided to supply the control device with data as to whether a second rear axle is coupled or uncoupled. Here, as explained above, each of all the three axles VA, HA1 and HA2 are equipped with an angle sensor and are of steerable design. As a rule the first front axle and the rear axle HA2 positioned in the direction of travel are synchronously steered in the all-wheel steering mode. The second axle, in other words the first rear axle HA1, automatically sets the correct steering angle.

The steering logic according to the disclosure for a 6×6 vehicle with two rear axles is characterized by the fact that in the vehicle according to the disclosure there is the possibility of uncoupling the add-on implement or the second rear axle, as the latter is connected to the vehicle by way of a corresponding docking socket and a corresponding docking plug-in unit. By uncoupling the second rear axle a 6×6 steering system at once becomes a 4×4 steering system. In accordance with the method according to the disclosure provision is made for the remaining rear axle HA1 on the vehicle to convert automatically to the synchronization mode of the 4×4 steering system explained above.

Figure 4:
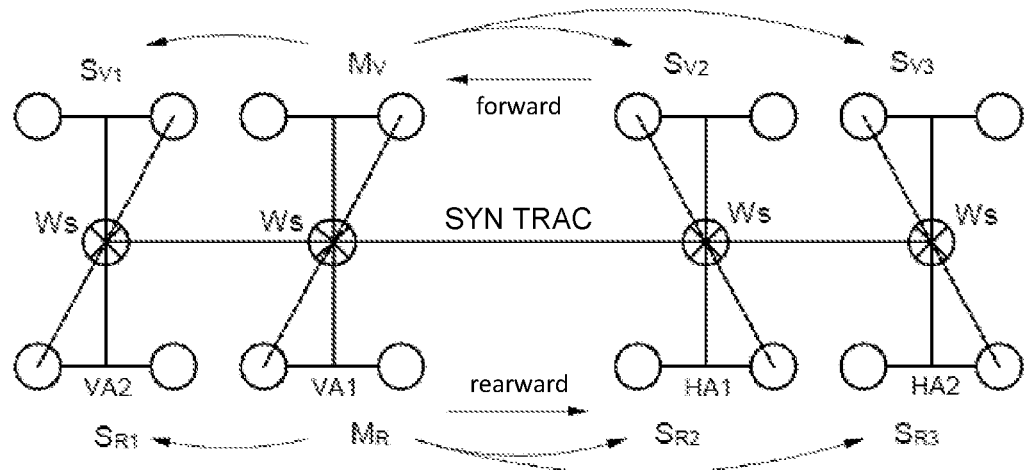
FIG. 4: a schematic representation of an 8×8 steering logic.

In accordance with the disclosure this is of course also possible in the reverse order when coupling a second rear axle HA2 of an add-on implement to the vehicle according to the disclosure. The system identifies the 6×6 mode via corresponding data links and converts to the synchronization mode of the 6×6 steering system. According to the disclosure provision is further made for a method of steering for a vehicle with four axles. In the context of the present disclosure this is designated as a method of steering for an 8×8 vehicle (FIG. 4).

Here provision is made for a second steerable front axle VA2 of another add-on implement and with the latter non-destructively detachable connectable (???) (method of steering for an 8×8 vehicle with two rear and two front axles), wherein the second steerable rear axle HA2 of the add-on implement has an angle sensor, and wherein, when the second rear axle HA2 and the second front axle VA2 are coupled, the second front axle VA2 and the two rear axles HA1 and HA2 of the first front axle VA1 follow on, this being designated as an 8×8 steering system with two front and two rear axles.

Here according to the disclosure it is envisaged that when coupling the second front axle VA2 the 6×6 steering system automatically becomes an 8×8 steering system, so that there will be automatic conversion to the synchronization mode of the 8×8 steering system and/or that when coupling the second front axle VA2 the 8×8 steering system automatically becomes a 6×6 steering system, so that conversion is automatically made to the synchronization mode of the 6×6 steering system described.

The requisite data as to whether a vehicle is coupled or uncoupled are registered by the control device by means of appropriate sensors and made available to the control device via data links. On the basis of data the control device can identify the 4×4 mode or the 6×6 mode or the 8×8 mode and automatically convert to the synchronization mode of the 4×4 or the 6×6 or the 8×8 steering system. Here again each of all the four axles VA1, VA2, HA1 and HA2 are equipped with an angle sensor and can be steered. All the other axles FA2, HA1 and HA2 track the master. In this vehicle according to the disclosure it is envisaged that the second front axle VA2 and the second rear axle HA2 can be uncoupled. These, for example, are again axles of a corresponding add-on implement. Here it is again envisaged according to the disclosure that the steering system, for example when one or both axles are uncoupled, will once again convert from an 8×8 to a 6×6 or 4×4 steering system. The automatic docking of a front axle and a rear axle in each case (i.e. four axles in total) can be effected automatically by way of a docking system. Additional trailers to an 8×8 system can only be effected by manual attachment/removal.

Figure 5:
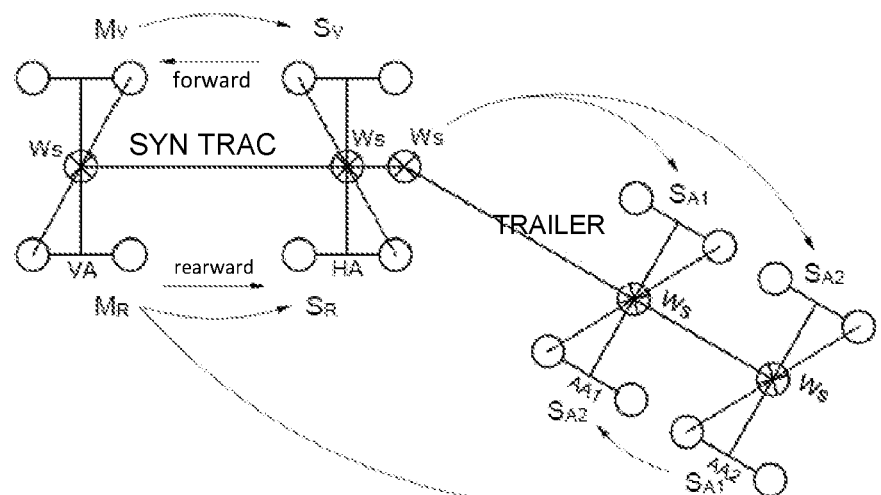
FIG. 5: a schematic representation of a 4×4 steering logic with a two-axle trailer.
Figure 6:
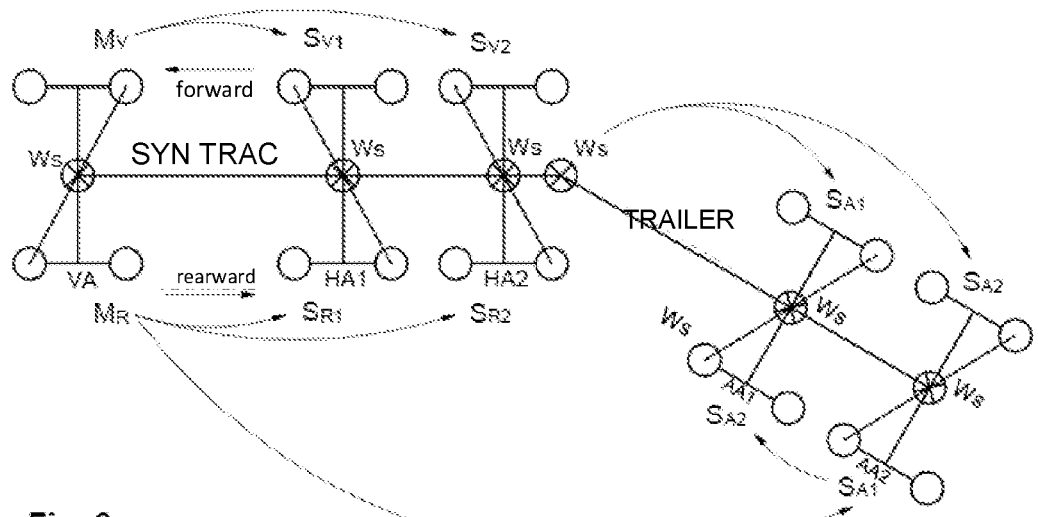
FIG. 6: a 6×6 steering logic with two rear axles with a two-axle trailer.

A method for steering a 4×4 vehicle with a two-axle trailer is described below. In the context of the present disclosure this is designated as a method of steering for a 4×4 vehicle with trailer (FIG. 5). A two-axle trailer with two axles AA1 and AA2, which are also of steerable design and have an angle sensor, is coupled to the 4×4 vehicle or to the 6×6 vehicle with two rear axles or to the 8×8 vehicle with two rear axles and two front axles, wherein in the coupling device is integrated a further angle sensor or an angle sensor device designed to provide control signals for controlling the rear axle (FIGS. 5 and 6). Here it can be envisaged according to the disclosure that the angle sensor in the trailer coupling instead of the angle sensor in the front axle VA1 is selected to control the axles of the trailer, so that parity with the first front axle VA1 of the vehicle and of the steerable trailer axle(s) AA1 and AA2 is automatically established, so that the trailer is automatically synchronously steered with the front axle VA1. At the same time a corresponding angle sensor is integrated in a coupling device (docking socket and docking plug-in unit) between vehicle and add-on implement or trailer. This sensor is designed to provide control signals to control the rear axles when the vehicle is moving.

Figure 7:
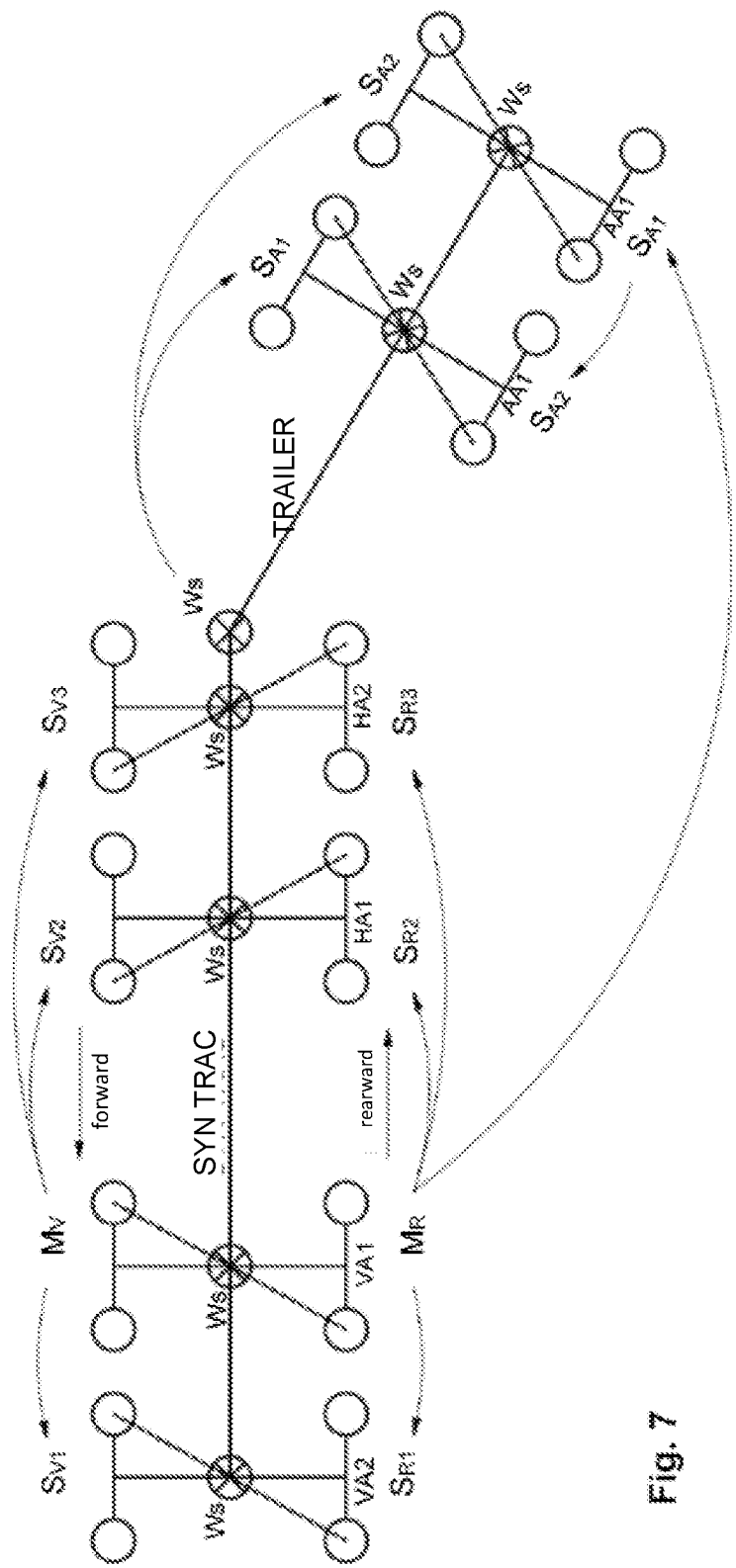
FIG. 7: a schematic representation of an 8×8 steering logic with a two-axle trailer.

In accordance with the disclosure, however, it is envisaged that the angle sensor in the trailer coupling can be selected instead of the angle sensor of the master axle to control the axles of the trailer. Parity is thus automatically established with the vehicle's first axle and the steerable trailer axle(s). It is thereby possible for the trailer to be automatically steered synchronously with the master axle. According to the disclosure provision is also made for a method of steering for a 6×6 vehicle with two rear axles and a two-axle trailer. In the context of the present disclosure this is designated as a method of steering for a 6×6 vehicle with two rear axles and a two-axle trailer (FIG. 6). Here the method of steering is effected in accordance with the principle described with reference to the 4×4 system. Furthermore, according to the disclosure provision may also be made for a vehicle with eight steerable axles, which accordingly pulls a two-axle trailer. In the context of the present disclosure this is designated as a method of steering for an 8×8 vehicle with a two-axle trailer (FIG. 7).

The aforementioned methods of steering can be transferred thereto analogously. In addition the method uses software which is designed in such a manner that on the basis of appropriate data it always automatically detects when axles are being uncoupled or coupled. This is effected via at least one appropriate data link. In this way it is always possible to adjust the steering parameters to the relevant add-on situation and to set these optimally.

LIST OF REFERENCE NUMERALS

FIG. 1; Key:
$M_V$ Master forward
$M_R$ Master rearward
$S_V$ Slave forward
$S_R$ Slave rearward
WS Angle sensor
VA Front axle
HA Rear axle
FIG. 2+3; Key:
$M_V$ Master forward
$M_R$ Master rearward
$S_{V1}$ Slave forward 1
$S_{V2}$ Slave forward 2
WS Angle sensor
$S_{R1}$ Slave rearward 1
$S_{R2}$ Slave rearward 2
VA Front axle
HA1 Rear axle 1
HA2 Rear axle 2
FIG. 4; Key:
$M_V$ Master forward
$M_R$ Master rearward
$S_{V1}$ Slave forward 1

$S_{V2}$ Slave forward 2
$S_{V3}$ Slave forward 3
WS Angle sensor
$S_{R1}$ Slave rearward 1
$S_{R2}$ Slave rearward 2
$S_{R3}$ Slave rearward 3
VA1 Front axle 1
VA2 Front axle 2
HA1 Rear axle 1
HA2 Rear axle 2
FIG. 5; Key:
$M_V$ Master forward
$M_R$ Master rearward
$S_V$ Slave forward
$S_R$ Slave rearward
WS Angle sensor
VA Front axle
HA Rear axle
$S_{A1}$ Slave axle 1
$S_{A2}$ Slave axle 2
AA1 Trailer axle 1
AA2 Trailer axle 2
FIG. 6; Key:
$M_V$ Master forward
$M_R$ Master rearward
$S_{V1}$ Slave forward 1
$S_{V2}$ Slave forward 2
WS Angle sensor
$S_{R1}$ Slave rearward 1
$S_{R2}$ Slave rearward 2
VA Front axle
HA1 Rear axle 1
HA2 Rear axle 2
$S_{A1}$ Slave axle 1
$S_{A2}$ Slave axle 2
AA1 Trailer axle 1
AA2 Trailer axle 2
FIG. 7; Key
$M_V$ Master forward
$M_R$ Master rearward
$S_{V1}$ Slave forward 1
$S_{V2}$ Slave forward 2
$S_{V3}$ Slave forward 3
WS Angle sensor
$S_{R1}$ Slave rearward 1
$S_{R2}$ Slave rearward 2
$S_{R3}$ Slave rearward 3
VA1 Front axle 1
VA2 Front axle 2
HA1 Rear axle 1
HA2 Rear axle 2
$S_{A1}$ Slave axle 1
$S_{A2}$ Slave axle 2
AA1 Trailer axle 1
AA2 Trailer axle 2

The invention claimed is:

1. A method for steering a vehicle comprising:
providing at least two steerable axles, a front axle VA1, a rear axle HA1, each with an angle sensor,
wherein the rear axle HA1 in an all-wheel steering mode is synchronously steered with the front axle VA1 in the opposite direction, this being designated as a 4×4 steering system; and
providing a control device for adjusting the steering angle of the axles on the basis of the data provided by the angle sensors, wherein:
a second steerable rear axle HA2 of an add-on implement and a second steerable front axle VA2 of a further add-on implement are provided, each having an angle sensor, wherein when the second rear axle HA2 and the second front axle VA2 are coupled, the second front axle VA2 and the two rear axles HA1 and HA2 track the first front axle VA1, wherein
the control device identifies the 4×4 mode or the 6×6 mode or the 8×8 mode on the basis of data and automatically converts to the synchronization mode of the 4×4 or the 6×6 or the 8×8 steering system.

2. The method of claim 1, wherein when the second front axle VA2 is coupled the 6×6 steering system automatically becomes an 8×8 steering system, so that there is automatic conversion to the synchronization mode of the 8×8 steering system, and/or that when the second front axle VA2 is uncoupled the 8×8 steering system automatically becomes a 6×6 steering system, so that there is automatic conversion to the synchronization mode of the 6×6 steering system described.

3. The method of claim 1, a two-axle trailer with two axles AA1 and AA2, which are also of steerable design and have an angle sensor, is coupled to the 4×4 vehicle or to the 6×6 vehicle with two rear axles or to the 8×8 vehicle with two front axles and two rear axles, wherein in the coupling device is integrated a further angle sensor designed to provide control signals for controlling the rear axles,
wherein the angle sensor in the trailer coupling instead of the angle sensor of the front axle VA1 "or of a master axle" is selected to control the axles of the trailer so that parity is automatically established with the first front axle VA1 of the vehicle and the steerable trailer axle(s) AA1 and AA2, and so that the trailer is automatically synchronously steered with the front axle VA1 (master axle).

* * * * *